US008577380B2

(12) United States Patent
Frias Martinez et al.

(10) Patent No.: US 8,577,380 B2
(45) Date of Patent: Nov. 5, 2013

(54) METHOD FOR AN AUTOMATIC IDENTIFICATION OF URBAN DENSE AREAS FROM CELL PHONES RECORDS

(75) Inventors: Enrique Frias Martinez, Madrid (ES); Vanessa Frias Martinez, Madrid (ES); Marcos Vieira, Madrid (ES); Nuria Oliver, Madrid (ES)

(73) Assignee: Telefonica, S.A., Madrid (ES)

( * ) Notice: Subject to any disclaimer, the term of this patent is extended or adjusted under 35 U.S.C. 154(b) by 54 days.

(21) Appl. No.: 13/098,515

(22) Filed: May 2, 2011

(65) Prior Publication Data

US 2012/0282888 A1    Nov. 8, 2012

(51) Int. Cl.
*H04W 40/00*    (2009.01)
*H04W 24/00*    (2009.01)

(52) U.S. Cl.
USPC .......................... 455/446; 455/456.1; 455/423

(58) Field of Classification Search
USPC .................. 455/435.2, 423, 446, 67.11, 67.7, 455/456.1–457
See application file for complete search history.

(56) References Cited

U.S. PATENT DOCUMENTS

| | | | |
|---|---|---|---|
| 5,535,195 A * | 7/1996 | Lee | 370/256 |
| 2004/0044441 A1 * | 3/2004 | Gupta et al. | 700/246 |
| 2006/0223523 A1 * | 10/2006 | Houllier et al. | 455/423 |
| 2009/0257373 A1 * | 10/2009 | Bejerano | 370/328 |
| 2010/0128041 A1 * | 5/2010 | Branets et al. | 345/441 |

OTHER PUBLICATIONS

Characterizing Dense Urban Areas from Mobile Phone-Call Data: Discovery and Social Dynamics by Vieira et al. dated Aug. 20-22, 2010.*
Word-of-Mouth Algorithms: What You Don't Know Will Hurt You by Cebrian et al., dated 2009.*
Voronoi diagrams and Delaunay triangulations by Steven Fortune, dated Jul. 19, 1995.*

* cited by examiner

*Primary Examiner* — Kathy Wang-Hurst
*Assistant Examiner* — Daniel Lai
(74) *Attorney, Agent, or Firm* — Sughrue Mion, PLLC

(57) ABSTRACT

Method for an automatic identification of urban dense areas from cell phones records, by using a computing device that receives as inputs: a geographical region R, a time period $\Delta t$ for which dense areas in the region R need to be computed, a set of BTSs in the region R, a set of CDRs generated by individuals during the time period $\Delta t$ using the set of BTSs of the region R, a coverage C and a granularity $\epsilon$. The method includes constructing a graph $G=(V, E)$, being V=vertexes and E=edges, using Delaunay triangulation, where each vertex $v_i$ of V corresponds to $bts_i$ of BTS in the geographical region R, and each edge $e_{i,j}$ of E represents connection between $bts_i$ and $bts_j$; eliminating from E all the edges in E with a distance between two connecting BTS larger than c, so that a desired spatial granularity is ensured; associating a weight $w_{i,j}$ to each edge $e_{i,j}$ of E that has not been eliminated, the weight representing the average density of the area covered by $bts_i$ and $bts_j$ during the time period $\Delta t$; constructing a data structure L that contains the dense areas using the edges of E; and applying a "Maximum Spanning Tree" type algorithm to detect dense areas given by the data structure L.

11 Claims, 3 Drawing Sheets

METHOD FOR AN AUTOMATIC IDENTIFICATION OF URBAN DENSE AREAS FROM CELL PHONES RECORDS

FIELD OF THE ART

The present invention generally relates to automatically detect dense areas in cell phone networks based on the natural tessellation of the spatial domain using and algorithm especially suited to work with human mobility data from cellphones, The invention concerns more particularly a method for an automatic identification of urban dense areas from cell phones records.

PRIOR STATE OF THE ART

A dense area is defined as a geographical region where there is a high concentration of individuals or activity when compared to its surroundings.

The problem of dense area detection was initially presented in the data mining community as the identification of the set(s) of regions from spatio-temporal data that satisfy a minimum density value. This problem was initially solved for spatial and multidimensional domains [5], and later for spatiotemporal domain [6], [7], [8]. In the former proposals, no time dimension is considered, while in the later ones only moving objects, typically represented by GPS sensors that continuously report their locations, are considered. Common to all of the above methods is that a fixed-size non-overlapping grid employed to aggregate the values over the spatial dimensions are considered. Therefore, these methods "constrain" the shape of the detected areas and, generally, identify dense areas that are a superset/subset of the desirable dense areas. Ideally, it is sought a technique that is able to detect dense areas whose shape is as similar as possible to the underlying dense geographical areas.

Note that the focus of this invention is on the automatic detection of dense areas, not hotspots [9]. Hotspots, as defined by scan statistics, are the largest discrepancy areas in which an independent variable has statistically different count values from the rest of the geographical areas [10]. Conversely, dense areas are defined as the (global or local) maxima of the distribution of the function under study [11].

Previous works on the identification of dense areas have been carried out following three main approaches: (1) density-based clustering techniques; (2) detecting dense fixed-size grids in spatio-temporal data; and (3) spatial-based techniques to detect local maxima.

Clustering algorithms for spatial, multidimensional and spatio-temporal data have been the focus of a variety of studies (e.g. [12], [13], [14], [15]). Common to all of the above methods is that clusters with high numbers of objects in a specific geographical area are associated, using spatial properties of the data, to denser regions. Traditional clustering techniques, like k-means [12], are used for grouping points in space with similar values of density. Furthermore, all of these methods require choosing some number of clusters or making underlying distributional assumptions of the data, which is not always easy to estimate.

There are a variety of solutions for detecting dense areas in spatial [5] and spatio-temporal [6], [7], [8] domains. The STING method [5] is a fixed-size grid-based approach to generate hierarchical statistical information from spatial data. Hadjieleftheriou et al. [8] present another method based on fixed-size grids where the main goal is to detect areas with a number of trajectories higher than a predefined threshold. Algorithms using a fixed-size window are proposed in [6], [7] that scan the spatial domain in order to find fixed-size dense regions that comply with some density requirements. All of these approaches are specifically designed to work for trajectory data where the exact location and speed direction of a trajectory are used in order to aggregate values in each grid for the spatial domain. Unfortunately, these methods cannot be applied to the current domain since in the majority of mobile phone databases mobile users are not continuous tracked. Furthermore, all the works described here detect dense areas of fixed-size above a threshold using a predefined grid.

Some solutions to detect dense areas are based on the identification of local maxima, typically using techniques inherited from computer vision (e.g. mean-shift [11]). Mean shift is a non-parametric feature-space analysis technique that identifies the modes of a density function given a discrete dataset sampled from that function using the gradient of the probability density function (typically a disc) until it reaches a local maxima. As in the previous case data is aggregated using a grid. There is no parameter to indicate the number of hotspots to be detected, so the technique is repeated, each time using a different seed and converging into one of the local maxima. There is no guarantee of detecting all maxima. Crandall et al. [11] use mean-shift to identify geographical landmarks from geo-tagged images.

In summary, previous works, have as main limitations: (1) the need to predefine the number of areas to automatically identify and/or (2) the need to predefine a threshold of what density is the minimum to consider a dense area and/or (3) they identify dense areas by overlaying a fixed grid on the geographical region, which might not correspond to the real shape of the underlying dense area.

SUMMARY OF THE INVENTION

It is necessary to offer an alternative to the state of the art which covers the gaps found therein.

This invention proposes a Dense Area Discovery (DAD) method to automatically detect dense areas using the infrastructure provided by cell phone networks. The proposal unlike the previous approaches, is not based on fixed-size grids, but on the original tessellation of the spatial domain, and also does not need as input the number of dense areas to detect or the definition of a threshold that defines the minimum density, thus overcoming the limitations of all the previous approaches. The DAD is especially suited to work with human mobility data from cell phones. Nevertheless, the type of information used by the DAD is not only available to telecommunication companies but also to an increasingly large number of companies that provide location-based services and mobile services which also collect (or are able to collect) human mobility data using the cell phone network infrastructure. Moreover, although the DAD method has been designed considering the infrastructure of a wireless phone network, it can also be applied to any problem where the data is represented in a domain that has predefined tessellation (e.g. zip codes).

Cell phone networks are built using a set of cell towers, also called Base Transceiver Stations (BTS) that are in charge of communicating cell phones with the network. Each BTS has latitude and a longitude, indicating its location, and gives cellular coverage to an area called a cell. The method assumes that the cell of each BTS is a 2-dimensional non-overlapping polygon, and it uses a Voronoi [19] tessellation to define its coverage area. Neighbouring towers can thus be identified using the Delaunay [18] triangulation. The DAD method detects dense areas while respecting the tessellation produced by Voronoi [19]. This tessellation is considered the natural or predefined tessellation of the data, and by respecting it, the dense areas identified are not constrained to a specific shape and respect the natural distribution of the data.

Call Detailed Record (CDR) databases are populated whenever a mobile phone makes/receives a phone call or uses a service (e.g. SMS, MMS). Hence, there is an entry in the CDR database for each phone call/SMS/MMS sent/received, with its associated timestamp and the BTS that handled it, which gives an indication of the geographical location of the mobile phone at a given moment in time. It has to be noted that no information about the position of a user within the coverage area of a BTS is known.

The proposed method can be used to identify dense areas based on activities or users. These activities are used to identify dense areas where there are a high number of phone/SMS/MMS calls while users are used to identify areas where there are a high number of unique individuals. The method is the same independently of which type of dense areas has to be identified.

This invention provides a method implemented using computing means for an automatic identification of urban dense areas from cell phones records, that receive as inputs: a geographical region R, a time period $\Delta t$ for which dense areas in the region R need to be computed, a set of BTSs in the region R, a set of CDRs generated by individuals during said time period $\Delta t$ using said set of BTSs of the region R, a coverage C and a granularity $\epsilon$, generating as outputs the subsets of BTS that correspond to the dense areas in region R with coverage C and granularity $\epsilon$ Each BTS of the region R is defined by a proper identifier and the longitude and latitude of its location, each CDR whether it is originated by a voice call and SMS or an MMS contains an originating encrypted number, a destination encrypted number, date and time of the call, duration of the call and the BTS used by the originating encrypted number.

The proposed method comprises following measures:
constructing a graph G=(V, E), being V=vertexes and E=edges, using Delaunay triangulation (implemented following the "Divide and Conquer" approach [16]), where each vertex $v_i$ of V corresponds to $bts_i$ of BTS in the geographical region R, and each edge $e_{i,j}$ of E represents connection between $bts_i$ and $bts_j$;
eliminating from E all the edges in E with a distance between two connecting BTS larger than $\epsilon$, so that a desired spatial granularity is ensured;
associating a weight $w_{i,j}$ to each edge $e_{i,j}$ of E that has not been eliminated, said weight representing the average density of the area covered by $bts_i$ and $bts_j$ during said time period $\Delta t$;
constructing a data structure L that contains said dense areas using said edges of E; and
applying an algorithm that is a variation of the "Maximum Spanning Tree algorithm" to detect dense areas given by said data structure L.

In the case where the graph G=(V, E) is already available it is directly inputted to the method and no triangulation step is needed.

The distance between two BTS is computed by translating their geographical coordinates into Cartesian coordinates and then computing their Euclidean distance.

BRIEF DESCRIPTION OF THE DRAWINGS

The previous and other advantages and features will be more fully understood from the following detailed description of embodiments, with reference to the attached drawings (some of which have already been described in the Prior State of the Art section), which must be considered in an illustrative and non-limiting manner, in which.

DETAILED DESCRIPTION OF SEVERAL EMBODIMENTS

Figure 1:
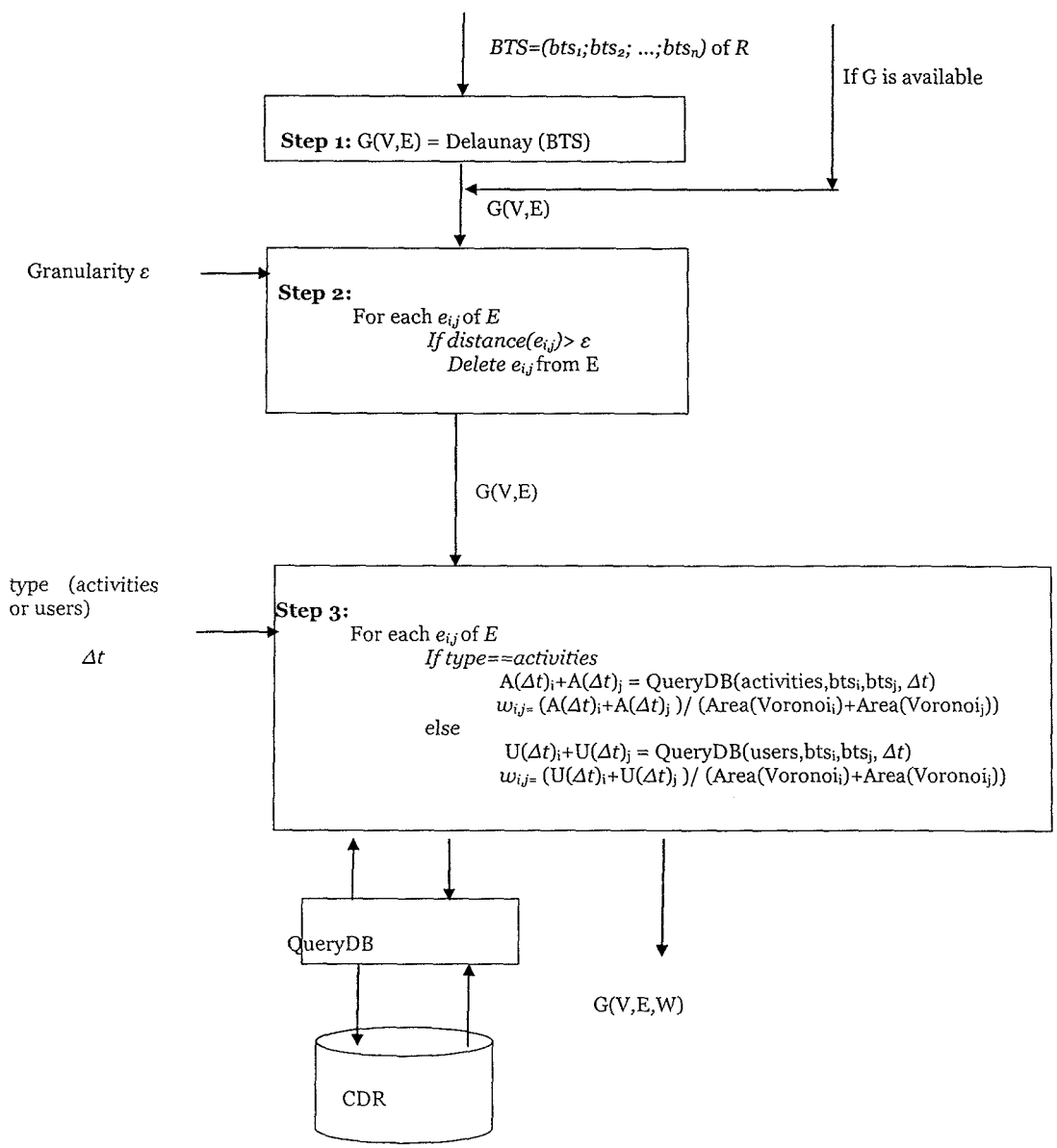
FIG. 1 shows a detailed description of the steps that comprises phase A of the method.
Figure 2:
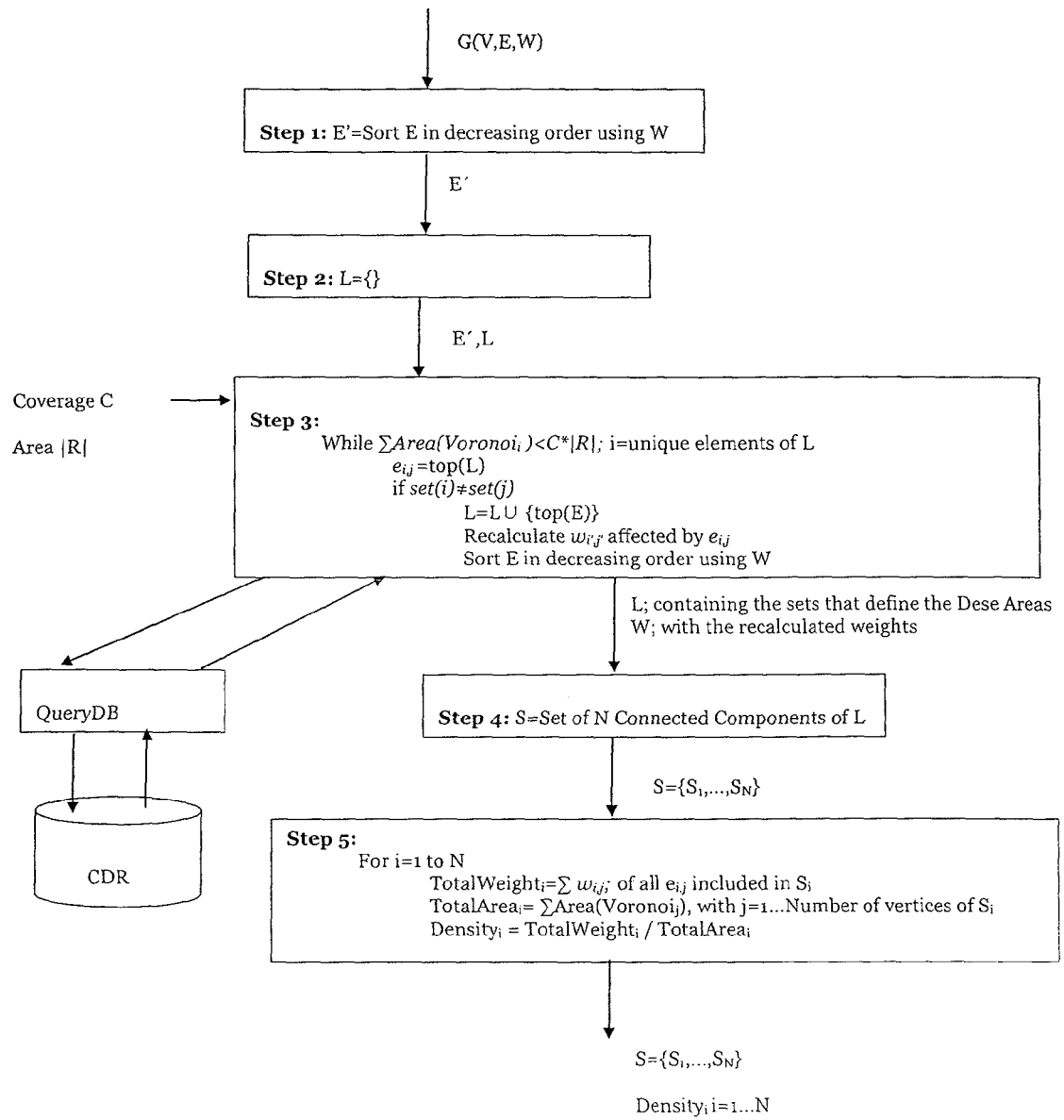
FIG. 2 shows a detailed description of the steps that comprises phase B of the method.

The Dense Area Discovery method (DAD) method of this invention has been designed to automatically discover dense areas of activities or unique users in a specific geographical region R and during a determined period of time $\Delta t$ such that: (1) it respects the original tessellation of the space defined by the cell phone network; (2) it does not need as input the number of dense areas (e.g. the number of clusters) to be identified; and (3) it guarantees that all dense areas are identified, covering up to a maximum percentage of the total region under consideration. In the scenario of the invention, the geographical region R corresponds to the total area where the dense areas have to be identified. Typically three levels are of interest: urban, regional and national.

Given an initial set of BTS=($bts_1$; $bts_2$; ...; $bts_N$) that gives coverage to a geographical region R characterized by its Voronoi tessellation, R=($V_1, V_2, \ldots, V_n$), it seeks to discover the optimal disjoint subsets of BTS that cover areas within R where either the number of activities or unique users reaches a maximum in a specific time period $\Delta t$. The activities, $A(\Delta t)_i$, at $bts_i$ correspond to the number of different calls that were handled by $bts_i$ during the time period $\Delta t$. Likewise, $U(\Delta t)_i$ measures the number of unique individuals whose calls where handled by $bts_i$ during the time period $\Delta t$.

An exhaustive exploration of all possible disjoint subsets of BTS becomes a daunting task as the number of BTS increases. Thus, the proposed method selects, at each step, the best subsets of $BTS_s$. In order to smooth noisy data, the minimum number of BTS that define a dense area is set to 2.

The method computes the dense areas in a geographical region R given two parameters: coverage, C, and granularity, $\epsilon$. The coverage C corresponds to the maximum percentage of the geographical area R that can be covered by the dense areas identified by the method. Typical values for C are in the range 0.05 to 0.5 (5% and 50%, respectively). Smaller C values may risk not identifying dense areas, and larger values are considered not relevant as the areas identified would cover most of the region R under study.

The granularity $\epsilon$ represents the maximum distance between two BTS in order to consider them to be part of the same dense area and to be joined to form a potential subset.

Hence, the parameter e sets the spatial granularity at which dense areas are identified (e.g. urban, regional or national levels). When seeking an adequate value for $\epsilon$, the distribution of BTS is a key factor. In urban areas this distribution is typically very dense and homogeneous such that each cell covers similar extension of areas. However, in sparsely populated areas (e.g. rural area), the distribution of BTS is scarce. For example, the average distance between two neighbouring urban BTS is around 1 km, while in rural environments this value may increase up to 10 km. Suitable values for $\epsilon$ are 1 km, 10 km and 100 km to detect dense areas in urban, regional, and national level, respectively.

The proposed Dense Area Discovery method (DAD) consists of two phases: (A) Graph Construction and (B) Computation of Dense Areas. It receives as inputs: the geographical region R, the time period $\Delta t$ for which the dense areas need to be computed, the set of BTSs in the region R, the set of CDRs generated by the individuals during the time period $\Delta t$ using the set of BTSs of the region R, the coverage C and the granularity $\epsilon$. Both the CDRs and the set of BTSs will be obtained from the database of the telecommunication companies, while the rest of the parameters while be defined as needed.

Each BTS of the region R will be defined by its identifier and the longitude and latitude of its location. Each CDR (whether it is originated by a voice call and SMS or an MMS) will contain the originating encrypted number, the destination encrypted number, the date and time of the call, the duration of the call and the BTS used by the originating encrypted number.

The Dense Area Discovery (DAD) method generates as outputs the subsets of BTS that correspond to the dense areas in region R with coverage C and granularity $\epsilon$. This subset of BTS will be defined by the output $S=\{S_1, \ldots, S_N\}$, where each $S_i$ contains a set of BTSs that defined a dense area, and $Density_i$, i=1 ... N, where each density value indicates the value of dense area $S_i$ and where N is the number of dense areas identified.

A. Graph Construction

Figure 3:
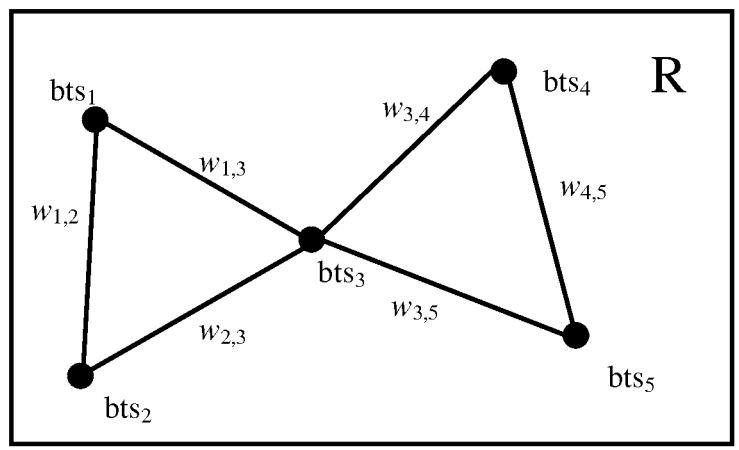

Step 1: Construct a graph G=(V, E) using Delaunay triangulation [18], where each vertex $v_i$ of V corresponds to $bts_i$ of BTS in the geographical region R, and each edge $e_{i,j}$ of E represents the connection between $bts_i$ and $bts_j$. FIG. 3 illustrates G=(V, E) with V=\{$bts_1$, $bts_2$, $bts_3$, $bts_4$, $bts_5$\} and E=\{$e_{1,2}$, $e_{1,3}$, $e_{2,3}$, $e_{3,5}$, $e_{3,4}$, $e_{4,5}$\}. The Delaunay triangulation is implemented following the Divide and Conquer approach [16]. It is also possible that the graph G=(V,E) is already available so it can be directly given as an input to the method. In this case the Step 1 will not be needed and the method will start in Step 2.

Step 2: All the edges in E with a distance between the two connecting BTS larger than $\epsilon$ are eliminated from E, in order to ensure the desired spatial granularity. The distance between two BTS is computed by translating their geographical coordinates into Cartesian coordinates and then computing their Euclidean distance. In FIG. 3, the edges $e_{1,4}$ and $e_{2,5}$ have been erased because $e_{1,4}>\epsilon$ and $e_{2,5}>\epsilon$. Using Delaunay triangulation $e_{1,5}$ and $e_{2,5}$ do not exist as $bts_1$-$bts_5$ and $bts_2$-$bts_4$ are not neighbour points.

Step 3: Associate a weight $w_{i,j}$ to each edge $e_{i,j}$ of E that has not been eliminated. The weight represents the average density of the area covered by $bts_i$ and $bts_j$ during the time period $\Delta t$. The density is given by two types: the total activity $A(\Delta t)_i+A(\Delta t)_j$ or the total number of (unique) users $U(\Delta t)_i+U(\Delta t)_j$ observed at $bts_i$ and $bts_j$ during $\Delta t$, divided by the geographical area (in km$^2$) covered by $bts_i$ and $bts_j$. Both values are computed from the CDR database using an optimized query system (see subsection D. CDR Query System) using the query $w_{i,j}$=QueryDB(type, $bts_i$, $bts_j$, $\Delta t$), where type indicates total activity or unique users.

B. Computation of Dense Areas

Step 1: The edges in E are first sorted by decreasing weight W.

Step 2: L, the data structure that contains the dense areas is initialized as an empty set.

Step 3: Edges of E are added to L until the total geographic area covered by the BTS that are connected by the edges in L is equal or larger than C|R|, where C is the coverage and |R| is the size of the area under study.

At each step the top edge $e_{i,j}$ of E with the highest weight $w_{i,j}$ is removed from E and added to the list L if and only if the edge connects vertices that belong to two different subsets (trees) defined by the edges already included in L. Additionally, every time an edge $e_{i,j}$ is added to L, the edges in E where either i or j are one of the vertices, are re-weighted and sorted again in order to avoid double counting of activities or unique users.

Step 4: Compute $S=\{S_1, \ldots, S_N\}$ containing all the connected components from the final list L. Each subset of connected edges Si represents a subset of BTS associated to a dense area. Specifically, the method uses the Shiloach-Vishkin [17] algorithm.

Step 5: The final density, $Density_i$ i=1 ... N, of activities or unique users associated to each dense area $S_i$ is computed as the sum of the weights of all of its edges divided by the geographical area (in km$^2$) covered by all the BTSs in the dense area.

D. CDR Query System

Since processing a very large CDR database containing several millions of records for a specific period of time $\Delta t$ can be computationally expensive (especially when long periods of time are considered), the method uses a spatio-temporal query system designed specifically for CDR databases [1] that guarantees a timely retrieval of information associated to any BTS. This index based structure allows to compute the weights of the edges by querying the system with the time period $\Delta t$, the $bts_i$ and $bts_j$, and the type of query (activities/users) under study.

Advantages of the Invention

The method here presented solves the limitations that previous approaches have when identifying dense areas using the information originated in a cell phone infrastructure, mainly:

(1) it uses the original tessellation of the data, being in this case the original tessellation the Voronoi approximation of the coverage of each BTS tower. This avoids the constrain in the shape of the detected areas imposed by a grid and also avoids identifying areas that are a superset/subset of the desirable dense areas (2) it does not need any prior knowledge of the number of dense areas to be identified.

(3) it does not need any prior knowledge regarding the minimum density value that defines a dense area.

Also, although is not typically mentioned in the state of the art, existing methods have limitations when dealing with huge amounts of information. For the method proposed here it is key to handle data in an efficient way as the amount of information that CDR databases contain can be in the order of Terabytes. The problem is solved by designing the method in conjunction with the query mechanism presented in [1].

Potential Uses of the Invention

The identification of dense areas, if the concept of dense area is defined by number of unique individuals, is one of the basic elements for a variety of applications that are typically included in the area of smart cities. The identification of dense areas is typically used as a building block for a variety of applications, including traffic forecasting [8], modelling of the spread of biological viruses [9], urban and transportation design [8] and location-based services [10]. For all this applications dense areas provide the necessary information to identify sensitive areas and their evolution over time. Also, these applications can be studied at different granularity levels as expressed by the method (urban, regional or national).

As an example, the information provided by dense areas is of paramount importance for, among others, urban and transport planners, emergency relief and public health officials, as it provides key insights on where and when there are areas of high density of individuals in an urban environment. Urban planners can use this information to improve the public transport system by identifying dense areas that are not well covered by the current infrastructure, and determine at which specific times the service is more needed. On the other hand, public health officials can use the information to identify the geographical areas in which epidemics can spread faster and, thus, prioritize preventive and relief plans accordingly.

If the dense area is defined by the number of activities (phone calls) the method has applications for the characterization and modelling of a wireless infrastructure, identifying which areas carry a high density of activities over time and thus can be used to redefine the network and adapt it according to its needs.

A person skilled in the art could introduce changes and modifications in the method steps described without departing from the scope of the invention as it is defined in the attached claims.

Acronyms
CDR Call Detail Records
BTS Base Transceiver Station
MMS Multimedia Messaging System
SMS Short Message Service

REFERENCES

[1] M. Vieira, E. Frias-Martinez, P. Bakalov, V. Frias-Martinez, and V. Tsotras, "Querying Spatio-Temporal Patterns in Mobile Phone-Call Databases," IEEE Mobile Data Management Conf., 2010.

[2] L. Liao, D. J. Patterson, D. Fox, and H. Kautz, "Learning and inferring transportation routines," Artificial Intelligence, vol. 171, 2007.

[3] D. Brockmann, "Human mobility and spatial disease dynamics," Review of Nonlinear Dynamics and Complexity—Wiley, 2009.

[4] J. Schiller and A. Voisard, Location-Based Services. Morgan Kaufmann, 2004.

[5] W. Wang and R. Muntz, "Sting: A statistical information grid approach to spatial data mining," in VLDB Conf., 1997.

[6] J. Ni and C. Ravishankar, "Pointwise-dense region queries in spatiotemporal databases," in ICDE, 2007.

[7] C. Jensen, D. Lin, B. C. Ooi, and R. Zhang, "Effective density queries on continuously moving objects," in ICDE, 2006.

[8] M. Hadjieleftheriou, G. Kollios, D. Gunopulos, and V. Tsotras, "On-line discovery of dense areas in spatio-temporal databases," in SSTD, 2003.

[9] D. Agarwal, A. McGregor, J. Phillips, S. Venkatasubramanian, and Z. Zhu, "Spatial scan statistics: Approximations and performance study," in ACM SIGKDD, 2006.

[10] M. Kulldorff, "A spatial scan statistic," Communications in Statistics-Theory and methods, 1997.

[11] D. J. Crandall, L. Backstrom, D. Huttenlocher, and J. Kleinberg, "Mapping the world's photos," in WWW Conf., 2009.

[12] M. Ester, H.-P. Kriegel, J. Sander, and X. Xu, "A local-density based spatial clustering algorithm with noise," in ACM SIGKDD, 1996.

[13] T. Zhang, R. Ramakrishnan, and M. Livny, "Birch: An efficient data clustering method for very large databases," in SIGMOD Conf., 1996.

[14] P. Kalnis, N. Mamoulis, and S. Bakiras, "On discovering moving clusters in spatio-temporal data," in SSTD, 2005, pp. 364-381.

[15] J.-G. Lee, J. Han, and K.-Y. Whang, "Trajectory clustering: a partition and-group framework," in SIGMOD Conf., 2007.

[16] L. Guibas and J. Stolfi, "Primitives for the manipulation of general subdivisions and the computation of Voronoi," Trans. on Graphics, 1985.

[17] Y. Shiloach and U. Vishkin, "An O(log n) parallel connectivity algorithm", Journal of Algorithms, vol. 3, 1982.

[18] http://en.wikipedia.orcdwiki/Delaunay triangulation

[19] http://en.wikipedia.org/wiki/Voronoi diagram

The invention claimed is:

1. Method for an automatic identification of urban dense areas from cell phones records, by using computing means that receive as inputs: a geographical region R, a time period $\Delta t$ for which dense areas in the region R need to be computed, a set of BTSs in the region R, a set of CDRs generated by individuals during said time period $\Delta t$ using said set of BTSs of the region R, a coverage C and a granularity $\epsilon$, the method comprising:
   a) determining by the computing means a graph G=(V, E), being V=vertexes and E=edges, using Delaunay triangulation, where each vertex $v_i$ of V corresponds to $bts_i$ of BTS in the geographical region R, and each edge $e_{i,j}$ of E represents connection between $bts_i$ and $bts_j$;
   b) eliminating from E all the edges in E with a distance between two connecting BTS larger than $\epsilon$, so that a desired spatial granularity is ensured;
   c) associating a weight $w_{i,j}$ to each edge $e_{i,j}$ of E that has not been eliminated, said weight representing the average density of the area covered by $bts_i$ and $bts_j$ during said time period $\Delta t$;
   d) constructing a data structure L that contains said dense areas using said edges of E; and
   e) applying a "Maximum Spanning Tree" type algorithm to detect dense areas given by said data structure L.

2. Method according to claim 1 wherein said Delaunay triangulation is implemented following the "Divide and Conquer" approach.

3. Method according to claim 1 wherein said graph G=(V, E) is already available and is directly inputted to the method.

4. Method according to claim 1, wherein the distance between two BTS is computed by translating their geographical coordinates into Cartesian coordinates and then computing their Euclidean distance.

5. Method according to claim 1, wherein the density is given by two types: the total activity A $(\Delta t)_i$+A $(\Delta t)_j$ or the total number of (unique) users U $(\Delta t)_i$+U $(\Delta t)_j$ observed at $bts_i$ and during $\Delta t$, divided by the geographical area (in $km^2$) covered by $bts_i$ and $bts_j$, both values being computed from the CDR database using an optimized query system.

6. Method according to claim 5, wherein said optimized query system comprises a spatio-temporal query system in which for each $bts_i$, two index structures are built: one B+ tree to organize entries by the temporal attribute timestamp and one inverted-index where entries are ordered by (phone, id, timestamp), so that an index-based structure is obtained that allow computing the weights of the edges by querying the system with the time period $\Delta t$, the $bts_i$ and $bts_j$, and the type of query (activities/users) under study using the query $w_{I,j}$=QueryDB(type, $bts_i$, $bts_i$, $\Delta t$), where type indicates total activity or unique users.

7. Method according to claim 1, wherein each BTS of the region R is defined by a proper identifier and the longitude and latitude of its location, each CDR whether it is originated by a voice call and SMS or by an MMS contains an originating encrypted number, a destination encrypted number, date and time of the call, duration of the call and the BTS used by an originating encrypted number.

8. Method according to claim 1, wherein said algorithm of step e) to detect dense areas comprises following steps:

f) the edges in E are first sorted by decreasing weight W
g) said data structure L that contains the dense areas is initialized as an empty set;
h) edges of E are added to L until the total geographic area covered by the BTS that are connected by the edges in L is equal or larger than $C|R|$, where C is the coverage and $|R|$ is the size of the area under study;
i) at each step the top edge $e_{I,j}$ of E with the highest weight $w_{i,j}$ is removed from E and added to the list L if and only if the edge connects vertices that belong to two different subsets (trees) defined by the edges already included in L; and
j) $S=\{S_1, \ldots, S_N\}$ is computed containing all the connected components from the final list L, each subset of connected edges, Si representing a subset of BTS associated to a dense area.

9. Method according to claim 8, wherein the Shiloach-Vishkin algorithm is used in step j).

10. Method according to claim 8, wherein additionally in step i), every time an edge $e_{I,j}$ is added to L, the edges in E where either i or j are one of the vertices, are re-weighted and sorted again in order to avoid double counting of activities or unique users.

11. Method according to claim 8, wherein final density, $Density_i$ i=1 ... N, of activities or unique users associated to each dense area $S_i$ is computed as the sum of the weights of all of its edges divided by the geographical area (in km²) covered by all the BTSs, and the method generates as output a subset of BTS that correspond to the dense areas in region R with coverage C and granularity $\epsilon$, said output being defined by the output $S=\{S_1, \ldots, S_N\}$, where each $S_i$ contains a set of BTSs that defined a dense area, and $Density_i$ i=1 ... N, where each density value indicates the value of dense area $S_i$.

* * * * *